US008627163B2

(12) United States Patent
Ito et al.

(10) Patent No.: US 8,627,163 B2
(45) Date of Patent: Jan. 7, 2014

(54) ERROR-CORRECTION FORCED MODE WITH M-SEQUENCE

(75) Inventors: Yutaka Ito, Tokyo (JP); Adrian Drexler, Meridian, ID (US); Brandi Jones, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 1297 days.

(21) Appl. No.: 12/055,207

(22) Filed: Mar. 25, 2008

(65) Prior Publication Data

US 2009/0249148 A1    Oct. 1, 2009

(51) Int. Cl.
*H04L 1/00* (2006.01)

(52) U.S. Cl.
USPC ............. 714/746; 714/41; 714/728; 714/739

(58) Field of Classification Search
None
See application file for complete search history.

(56) References Cited

U.S. PATENT DOCUMENTS

| | | | |
|---|---|---|---|
| 4,782,487 A * | 11/1988 | Smelser ........................ 714/723 |
| 4,870,346 A * | 9/1989 | Mydill et al. ................. 324/73.1 |
| 5,138,619 A * | 8/1992 | Fasang et al. ................. 714/718 |
| 5,142,541 A * | 8/1992 | Kim et al. ..................... 714/764 |
| 5,268,949 A | 12/1993 | Watanabe et al. |
| 5,276,690 A * | 1/1994 | Lee et al. ...................... 714/703 |
| 5,502,732 A * | 3/1996 | Arroyo et al. ................. 714/746 |
| 5,574,855 A * | 11/1996 | Rosich et al. .................. 714/41 |
| 5,631,913 A * | 5/1997 | Maeda .......................... 714/732 |
| 5,872,910 A * | 2/1999 | Kuslak et al. .................. 714/41 |
| 6,397,357 B1 * | 5/2002 | Cooper ......................... 714/703 |
| 6,539,503 B1 * | 3/2003 | Walker ......................... 714/703 |
| 6,751,756 B1 * | 6/2004 | Hartnett et al. ................. 714/54 |
| 6,799,287 B1 * | 9/2004 | Sharma et al. ................. 714/703 |
| 6,820,047 B1 * | 11/2004 | Aizawa et al. .................. 703/14 |
| 6,992,946 B2 | 1/2006 | Ooishi |
| 7,003,708 B1 * | 2/2006 | Ireland et al. ................. 714/739 |
| 7,216,198 B2 | 5/2007 | Ito et al. |
| 2002/0104045 A1 * | 8/2002 | Cooper ......................... 714/42 |
| 2004/0225943 A1 * | 11/2004 | Brueggen ...................... 714/758 |
| 2005/0188281 A1 * | 8/2005 | Nguyen et al. ................. 714/42 |
| 2005/0283704 A1 | 12/2005 | Ito et al. |
| 2006/0010339 A1 * | 1/2006 | Klein .............................. 714/5 |
| 2006/0179369 A1 * | 8/2006 | Bravo et al. ................... 714/718 |
| 2006/0206769 A1 | 9/2006 | Klein |
| 2007/0011599 A1 * | 1/2007 | Levitan ......................... 714/801 |
| 2007/0157059 A1 * | 7/2007 | Tsao et al. .................... 714/733 |
| 2008/0016392 A1 * | 1/2008 | Earl et al. ........................ 714/6 |
| 2008/0052603 A1 * | 2/2008 | Wiatrowski et al. .......... 714/776 |

OTHER PUBLICATIONS

Krasniewski et al., "Circular Self-Test Path: A Low-Cost BIST Technique for VLSI Circuits", 1989, IEEE.*

* cited by examiner

*Primary Examiner* — Gabriel Chu
(74) *Attorney, Agent, or Firm* — Knobbe, Martens, Olson & Bear, LLP (57) ABSTRACT

Improved apparatus, systems and methods, such as those for testing an error correction code (ECC) encoder/decoder for solid-state memory devices, are provided. In one or more embodiments, the improved systems and methods deliberately inject errors into memory storage areas of memory devices to test the operation of the ECC encoder/decoder.

22 Claims, 8 Drawing Sheets

ERROR-CORRECTION FORCED MODE WITH M-SEQUENCE

BACKGROUND OF THE INVENTION

1. Field of the Invention

Embodiments of the invention relate to integrated circuit memory devices, and in particular, to testing error correction code systems.

2. Description of the Related Art

Digital systems typically contain memory devices, such as solid-state devices, to store data. The capacity to store the data accurately is desired in any storage media. To ensure more accurate storage of data, certain memory devices employ error correction code (ECC), such as, for example, ECC encoders/decoders (for example, modules configured to encode and/or decode), to detect and/or correct errors. The ECC encoders/decoders are tested to assess whether the ECC encoders/decoders can accurately detect and/or correct errors during the operation of memory devices. However, test of the operation of the ECC encoders/decoders can be time consuming and costly because of the difficulty of providing the ECC encoders/decoders erroneous data for the ECC encoder/decoders to detect and/or correct. For example, when a dynamic random access memory device is being tested, it can take a relatively long time for test data to degrade, which is then used to test the operation of the ECC encoder/decoders.

BRIEF DESCRIPTION OF THE DRAWINGS

These and other features will now be described with reference to the drawings summarized below. These drawings and the associated description are provided to illustrate one or more embodiments of the invention, and not to limit the scope of the invention.

DETAILED DESCRIPTION

Although certain embodiments and examples are disclosed below, it will be understood by those of ordinary skill in the art that the invention extends beyond the specifically disclosed embodiments to other alternative embodiments and uses of the invention and obvious modifications and equivalents thereof. Thus, the particular embodiments described below are not intended to limit the scope of the invention herein disclosed.

As used herein, the word "module" refers to logic embodied by hardware or software (including firmware), or to a combination of both hardware and software, or to a collection of software instructions. Software instructions may be embedded in firmware, such as an EPROM, and executed by a processor. It will be further appreciated that hardware modules may be included of connected logic units, such as gates and flip-flops, and/or may be included of programmable units, such as programmable gate arrays or processors. The modules described herein can be implemented as software modules, or may be represented in hardware or firmware. Generally, the modules described herein refer to logical modules that may be combined with other modules or divided into sub-modules despite their physical organization or storage.

Improved systems and methods for testing an error correction code (ECC) encoder/decoder for solid-state memory devices will be described in greater detail herein with reference to the drawings. In one or more of the described embodiments, the improved systems and methods generate erroneous data and purposely write the erroneous data into memory storage areas of memory devices such that the ECC encoder/decoder can detect and/or correct the injected erroneous data. Erroneous data refers to data that intentionally includes some errors such that an error correction code generated based on the data without the errors would not match error correction code generated based on the erroneous data. In one embodiment, these techniques are built into the memory device (built-in self test or BIST).

Figure 1:
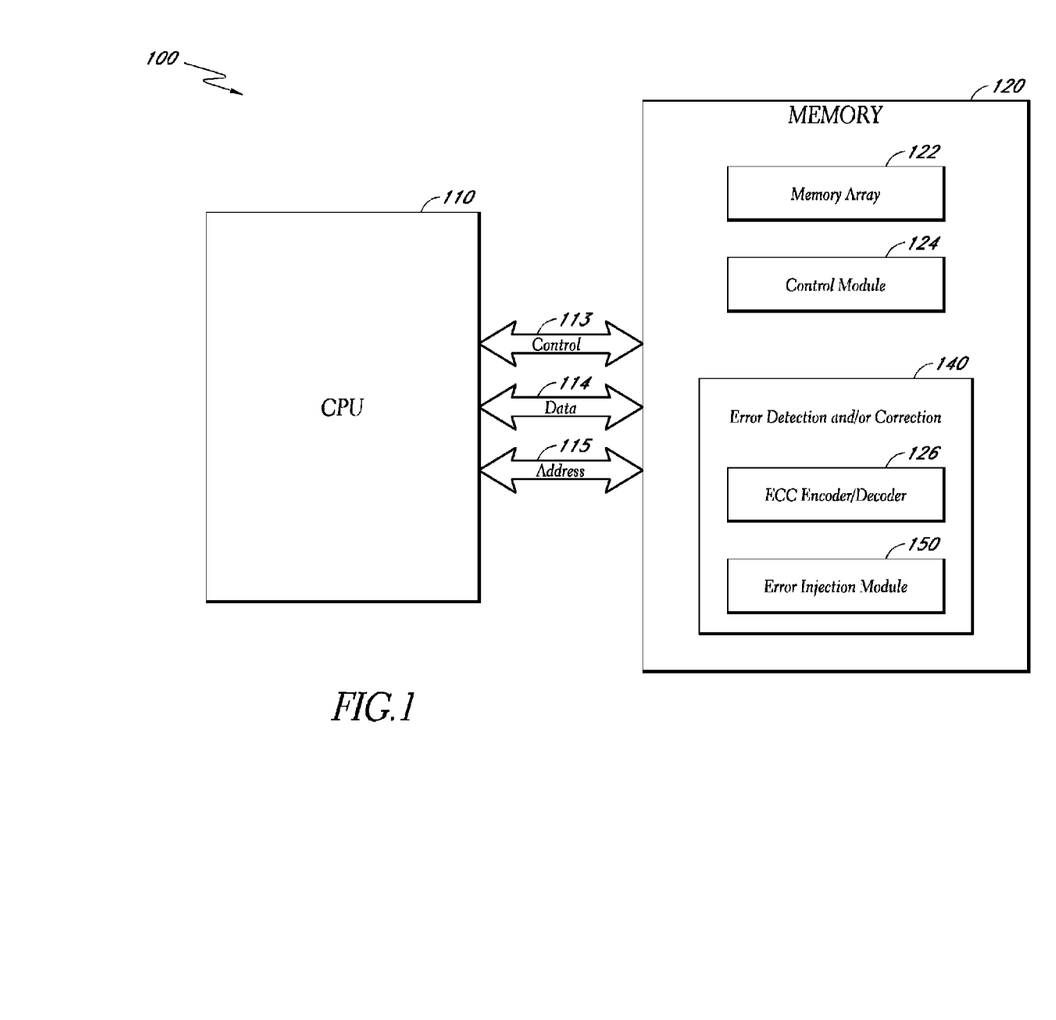
FIG. 1 illustrates a block diagram of a computer system including a memory device.

FIG. 1 illustrates a high level block diagram of one embodiment of a computer system 100 such as, for example, a computer, notebook, wireless device, PDA, or any other electronic device that uses digital memory systems to store data. The computer system 100 of FIG. 1 includes a processor, such as a central processing unit (CPU) 110 and the solid-state memory device 120. Other examples of processors could include, but are not limited to, separate or individual processing cores, separate or distributed processing logic, general purpose processors, special purpose processors, application specific integrated circuits (ASICs) with processing functionality, memory controllers, system controllers, etc. As shown in FIG. 1, the CPU 110 is connected to the solid-state memory device 120 through a control bus 113, a data bus 114, and an address bus 115. The CPU 110 can be configured to control the operation of the solid-state memory device 120. In one embodiment, the computer system 100 is configured to include hardware and software to test the operation of various electronic components of the solid-state memory device 120 such as ECC encoder/decoders, memory arrays, etc.

The solid-state memory device 120 is capable of accepting data from the CPU 110, storing the data, and subsequently providing the data back to the CPU 110. The solid-state memory device 120 as illustrated in FIG. 1 depicts a dynamic random access memory (DRAM) device. However, the solid-state memory device 120 can be any suitable volatile or non-volatile electronic data storage device, including, but not limited to, synchronous dynamic random access memory (SDRAM), double data rate SDRAM (DDR), rambus DRAM (RDRAM), double data rate 2 SDRAM (DDR2), double data rate 3 SDRAM (DDR3), Flash memory, programmable conductor random access memory (PCRAM), magnetic random access memory (MRAM), etc. The CPU 110 can be configured to control the operation of the solid-state memory device 120 by sending control signals through the control bus 113, such as, for example, instructions for the solid-state memory device 120 to write data transmitted through the data bus 114 to a memory cell address sent through the address bus 115. In certain embodiments, the CPU 110 controls the operation of the solid-state memory device 120 using separate system and memory controllers (not shown).

Figure 2:
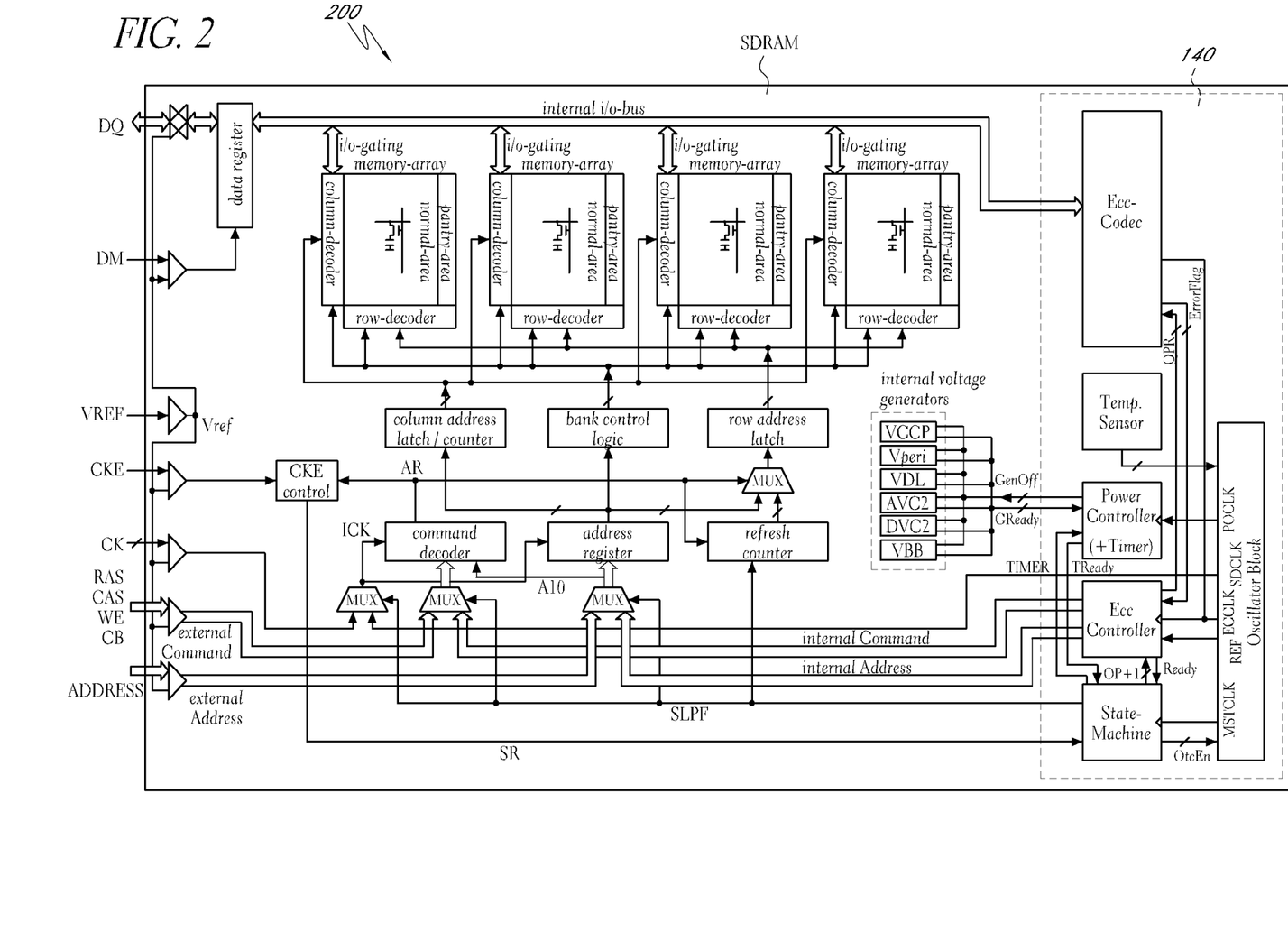
FIG. 2 is a block diagram of a synchronous dynamic random access memory.

As FIG. 1 further illustrates, the solid-state memory device 120 includes a memory array 122, a control module 124, and an error detection and/or correction module 140. The error detection and/or correction module 140 includes an ECC encoder/decoder 126 and an error injection module 150. Various electronic elements located within the solid-state memory device 120 such as the memory array 122, the control module 124, and the error detection and/or correction module 140 can be connected via various internal data buses (not shown) and/or control lines. To illustrate various electrical components present in the solid-state memory device 120, one type of the solid-state memory device 120, SDRAM device 200, is shown in FIG. 2. As illustrated in FIG. 2, the SDRAM Device 200 contains various integrated circuit components such as, for example, input/output (I/O) gates and controllers, counters, latch and decoder circuits, data registers, row and column decoders, bank control logic, command decoders, muxes, refresh counters, etc.

The error detection and/or correction module 140 can be (or can be part of) a low power consumption module that controls the operation of the solid-state memory device 120 in a low-power consumption mode using several sub-components such as the ECC encoder/decoder 126, a power controller (not shown), an ECC controller (not shown), etc. The various components of one embodiment of the error detection and/or correction module 140 are further depicted in the SDRAM of FIG. 2. Although not discussed in detail, in certain embodiments, the error detection and/or correction module 140 can be configured to control various processes when the solid-state device 120 is operating in a low-power consumption mode, including power-off, refresh, burst refresh, and/or the like. In other embodiments, the solid-state memory device 120, for example using the ECC encoder/decoder 126, generates error correction code when the solid-state memory device 120 enters the low-power consumption mode.

The power consumed by solid-state memory devices is typically affected by their operating mode. Refresh operations in the low-power consumption mode, for example, are typically performed by reading data bits from the memory cells of a memory array and then writing those same data bits back to the same cells. A relatively large amount of power is required for refreshing data because memory cell arrays are being actuated in a rapid sequence. The power that solid-state memory devices consume during refresh operations can be reduced by reducing the rate at which the memory cells are being refreshed. However, reducing the refresh rate increases the risk of data stored in the memory array cells being lost. Detecting and/or correcting errors, for example using the ECC encoder/decoder 126, enables solid-state memory devices to reduce the refresh rate because some errors become tolerable. Lowering the refresh rate of the solid-state memory device 120 allows, for example, the solid-state memory device 120 to draw less electrical power, including during the low-power consumption mode.

The ECC encoder/decoder 126 can be configured to generate error correction code, such as, for example, parity bits, from write data received from the CPU 110 via the data bus 114. In some embodiments, the solid-state memory device 120 writes, for example using an ECC controller (not shown), the error correction code along with the write data in the memory array 122 of the solid-state memory device 120. When data is retrieved (for example, read) from the memory array 122 of the solid-state memory device 120, the ECC encoder/decoder 126 uses the error correction code to determine if the read data is corrupted with errors, and in certain circumstances, correct the errors. In certain embodiments, the ECC encoder/decoder 126 detects and/or corrects errors by retrieving the read data as well as the error correction code, generating a new set of error correction code based on the read data, and comparing the new set of error correction code with the retrieved error correction code. Although not shown, the ECC encoder/decoder 126 is understood to include various sub-components to detect and/or correct errors, such as, without limitation, error location modules, error correction code generating modules, ECC control logic modules, and/or the like. The corrected read data is then coupled to the CPU 110 through the data bus 114. Although the illustrated solid-state memory device 120 writes the error correction code in the same memory array 122 as the data (for example different row and/or column), in other embodiments, the solid-state memory device 120 alternatively writes the error correction code in a syndrome storage area located on, for example, the ECC encoder/decoder 126.

With reference again to FIG. 1, the error injection module 150 of the module 140 can be, for example any circuit that is capable of generating erroneous data. The error injection module 150 can generate erroneous data that can be purposely written to, for example, the memory array 122, according to the desired configuration. In one embodiment, the error injection module 150 can be configured to generate non-random data such as all zeros, all ones, or various combinations of zeros and ones. The error injection module 150 can further be configured to generate data according to other patterns, for example, sequentially such as in counters or as determined by other non-random algorithms.

In an illustrative embodiment, the error injection module 150 is configured to generate pseudo random erroneous data (for example, a sequence of digits that approximate the properties of random numbers), and purposely write the pseudo random erroneous data in the memory array 122. In one embodiment, the error injection module 150 is not truly random in that the randomness of the sequence is determined by a relatively small set of initial values. As discussed further below, the error injection module 150 can write the pseudo random erroneous data into the memory array 122 of the solid-state memory device 120 to purposely introduce erroneous data for the ECC encoder/decoder 126 to detect and/or correct. Pseudo random erroneous data retain an additional benefit because the data can be generated using linear feedback shift registers, as will be described in greater detail with respect to FIG. 3A. In some embodiments, linear feedback shift registers of the solid-state memory device 120 (for example the ECC encoder/decoder, other circuitry, etc.) can be configured to be usable for both ECC functions as well as erroneous data generation. The error injection module 150 can generate pseudo random erroneous data using various known algorithms, such as, for example, maximum-length sequence (MLS), fortuna, mersenne twister, etc.

As illustrated in FIG. 1, the ECC encoder/decoder 126 and the error injection module 150 are separate circuit components of the solid-state memory device 120. In other embodiments, the ECC encoder/decoder 126 and the error injection module 150 can be combined into one module. In still other embodiments as will be further discussed with respect to FIG. 3A and FIG. 5B, the ECC encoder/decoder 126 can be configured to generate error correction code as well as perform the functions of the error injection module 150.

Figure 3A:
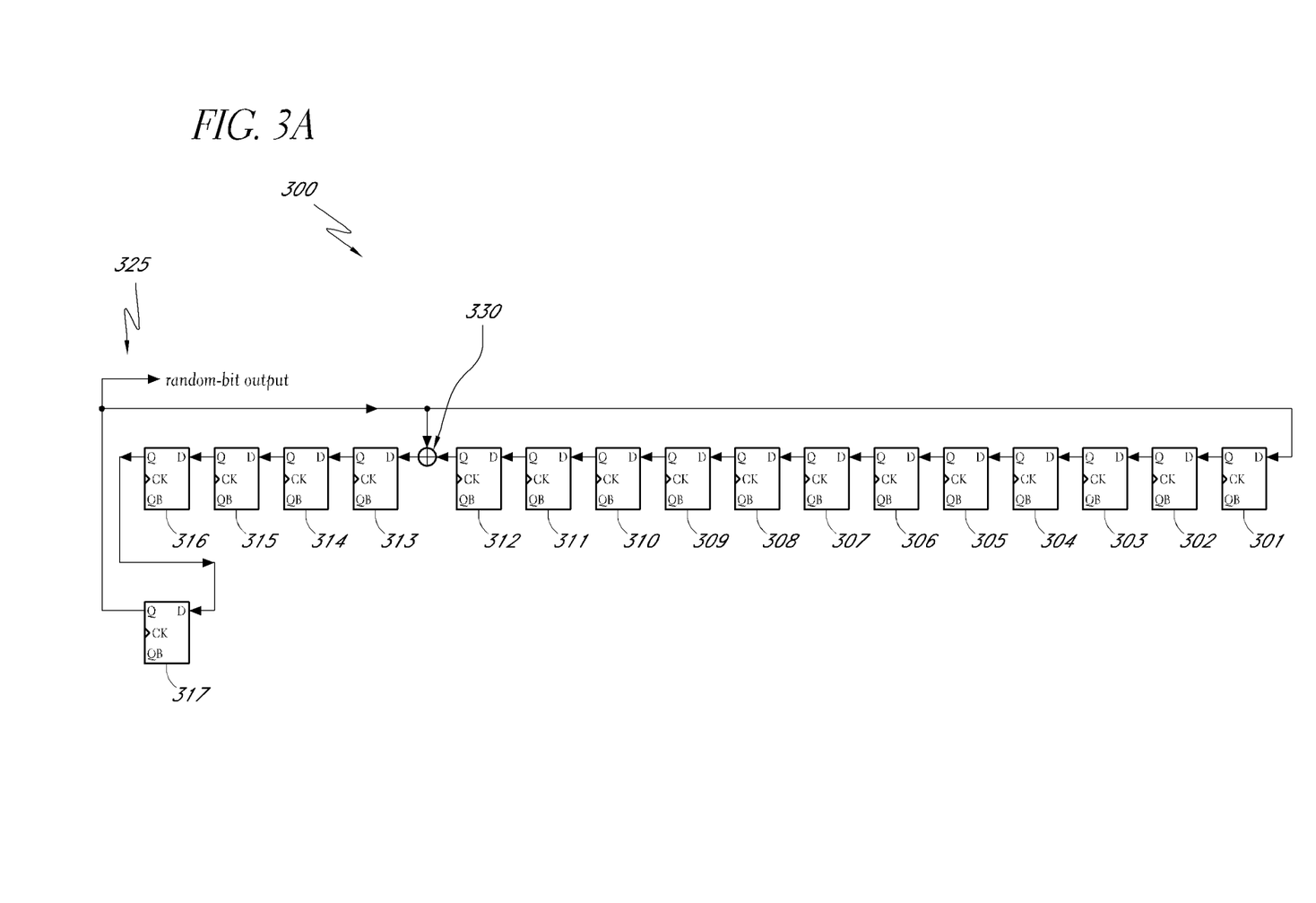
FIG. 3A illustrates an embodiment of maximum-length sequence code generation circuitry.

FIG. 3A illustrates a circuit diagram of one embodiment of the error injection module 300 configured to generate erroneous data. In the illustrated embodiment, the error injection module 300 in FIG. 3A is configured to generate pseudo random erroneous data using the MLS algorithm. The pseudo random erroneous data can subsequently be purposely written into the memory array 122 as erroneous data, providing the ECC encoder/decoder 126 with errors to detect and/or correct. The error injection module 300 of FIG. 3 includes D-type flip-flops (FFs) 301-317 and an XOR gate 320. The XOR gate 320 and the outputs of the FFs 301-317 are arranged such that the error injection module 300 operates as a step shift register that has a feedback loop by way of the XOR gate 320. The FFs 301-317 are cascaded such that the output of each $FF_n$ is provided as an input to the next $FF_{n+1}$. The output of the last FF 317 is provided as an input to the first FF 301. As further shown in FIG. 3A, the output of the last FF 317 is coupled through the XOR gate 320 along with the output of the FF 312 and provided as an input to the FF 313.

The FFs 301-317 further include clock inputs CK $_{1-17}$ configured to receive a clock signal such as the system clock. In some embodiments, input signals to the FFs 301-317 are sampled on the positive edge of the clock signal that is coupled to clock inputs CK $_{1-17}$. The error injection module 300 of FIG. 3A can be initialized by any non-zero initial value, for example, by setting any of the inputs to the FFs 301-317 to a non-zero value. When active, the output of the FF 317 is a pseudo random erroneous data that is generated according to the MLS algorithm. Other shift register configurations that generate pseudo random erroneous data will be readily determined by one of ordinary skill in the art.

Figure 3B:
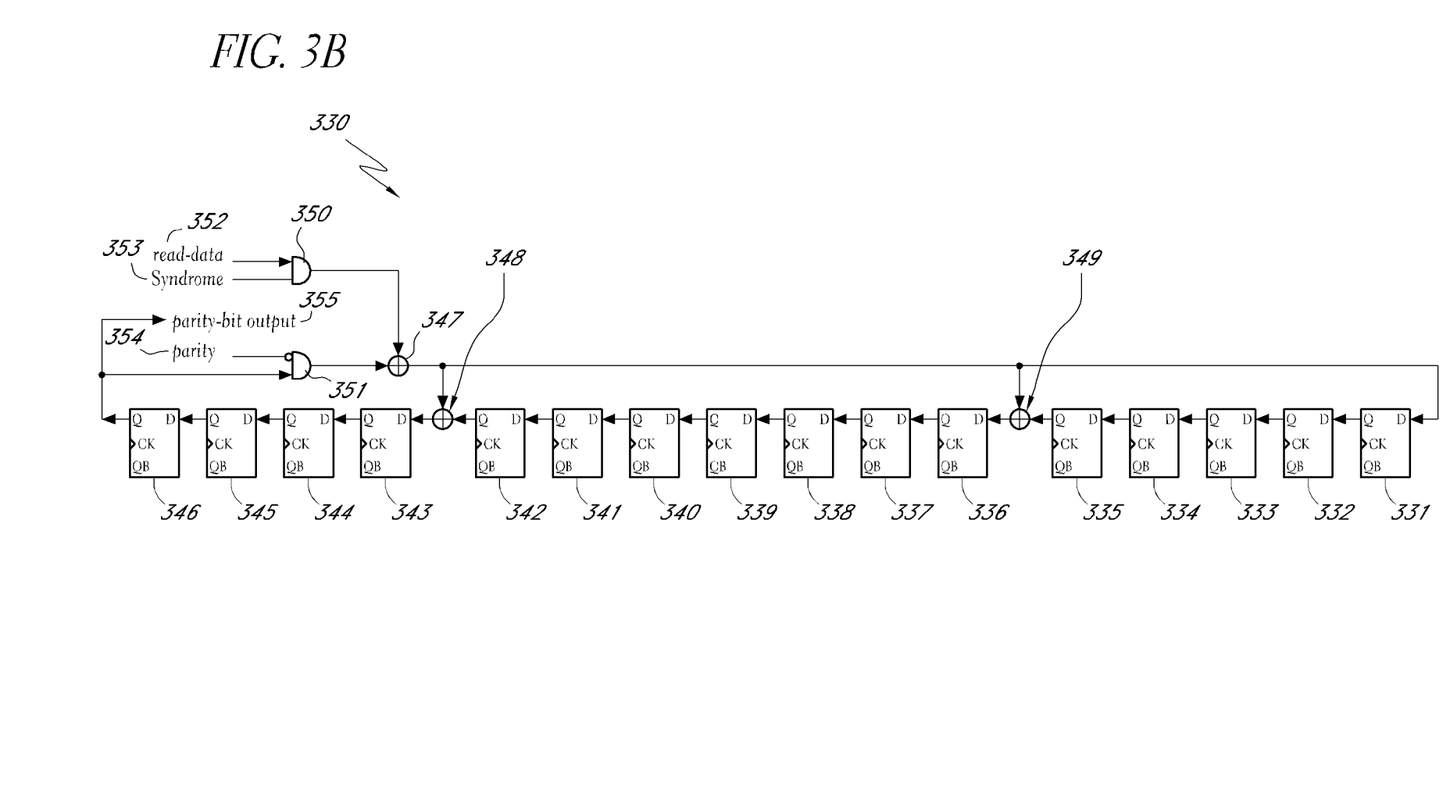
FIG. 3B illustrates an embodiment of an ECC encoder configured to generate error correction code.

FIG. 3B illustrates a circuit diagram of one embodiment of an ECC encoder 330 according to the present invention. The ECC encoder 330 has similar circuitry as the error injection module 300 of FIG. 3A and can be further configured to generate error correction code, for example, using the Hamming code algorithm. The ECC encoder 330 includes FFs 331-346, XOR gates 347-349, and AND gates 350, 351. The ECC encoder 330 has input signals read-data 352, Syndrome signal 353, Parity signal 354 and a parity-bit (error correction code) output signal 355.

The AND gates 350, 351 are in communication with the XOR gate 347, which further communicates with the XOR gates 348, 349 and the FF 331. The FFs 331-346 are cascaded such that the output of each $FF_n$ is provided as an input to the next $FF_{n+1}$. The parity bit-output 355 and the Parity signal 354 are provided as inputs to the AND gate 351. The read-data signal 352 and the Syndrome signal 353 are provided as inputs to the AND gate 350. The FFs 331-336 are arranged such that the ECC encoder 330 operates as a step shift register that has a feedback loop by way of the XOR gates 348, 349. As shown in FIG. 3B, the output signal of the XOR gate 347 is coupled through the XOR gate 348 along with the output signal of the FF 342 and provided as an input to FF 343. The output signal of the XOR gate 347 is further coupled through the XOR gate 349 along with the output signal of the FF 335 and provided as an input to the FF 336. The output signal of the XOR gate 347 is directly provided as an input to the FF 331.

The ECC encoder 330 has Syndrome and Parity operating modes. When the Syndrome input signal 353 is high, the Parity input signal 354 is low and the ECC encoder 330 performs an error correction code calculation based on the read-data 352. When the Parity input signal 354 is high, the Syndrome input signal 353 is low and the ECC encoder 330 outputs the calculated error correction code as the parity-bit output 355. In operation, therefore, the ECC encoder 330 calculates and outputs the error correction code via the parity-bit output signal 355 for input data that is provided as the read-data 352.

As with the error injection module 300 of FIG. 3A, the FFs 331-346 further include clock inputs CK 331-336 configured to receive a clock signal. In some embodiments, the FFs 331-346 are sampled on the positive edge of the clock signal. The ECC encoder 330 can be initialized by cyclically shifting and resetting the FFs 331-346.

Figure 3C:
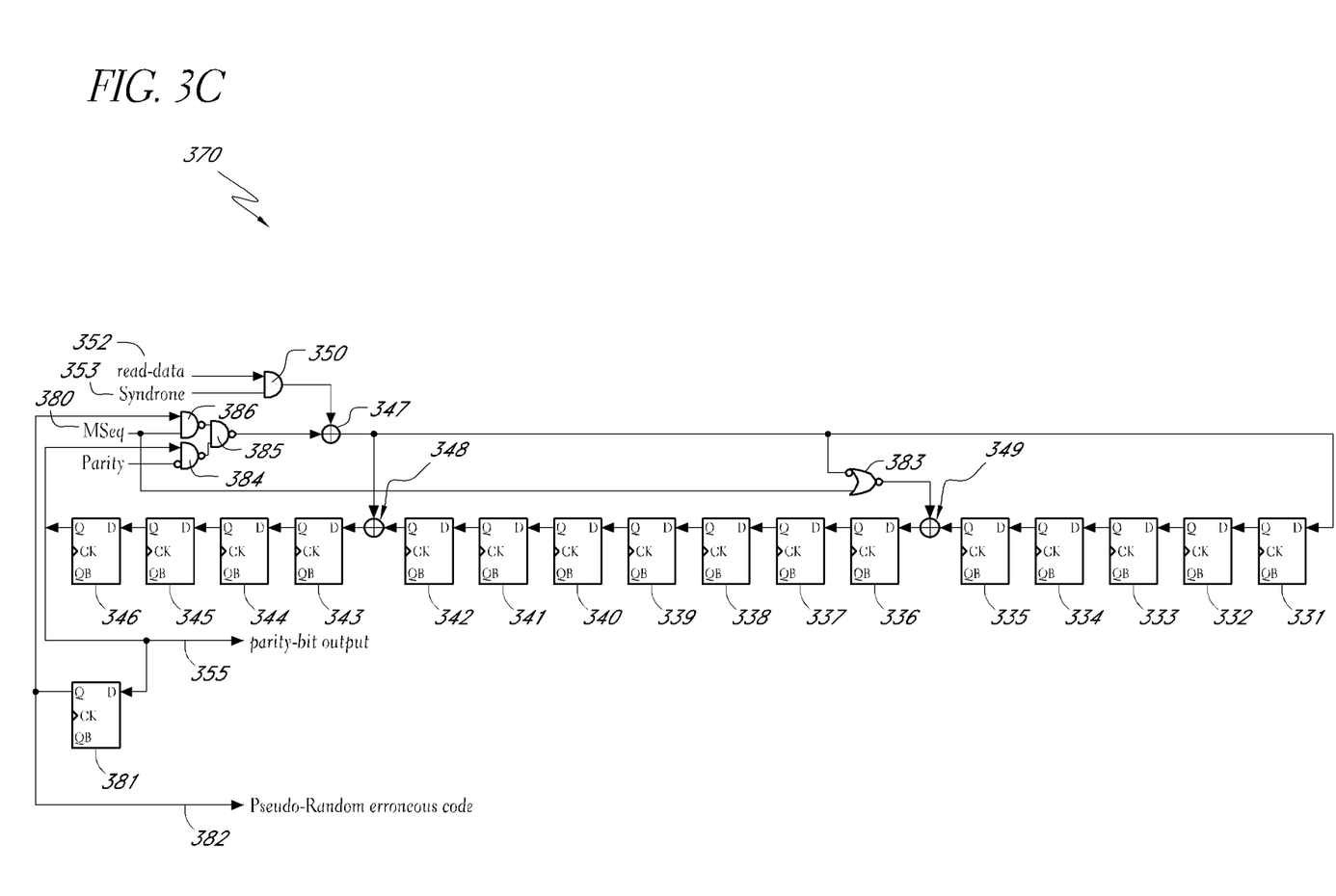
FIG. 3C illustrates an embodiment of an ECC encoder configured to generate error correction code as well as pseudo random erroneous data.

FIG. 3C illustrates one embodiment of an ECC encoder 370 that is configured to perform the functions of the error injection module 300. The illustrated ECC encoder 370 generates error correction code and as well as pseudo random erroneous data. As previously mentioned with reference with FIGS. 3A and 3B, the error injection module 300 and the ECC encoder 330 share similar circuitry. As a result, the ECC encoder 370 can be configured to generate error correction code according to the hamming code and pseudo random erroneous data according to the MLS algorithm, for example, by adding three more logic gates and one more flip flop to the conventional ECC encoder of FIG. 3B. Although the preferred embodiment demonstrates the ECC encoder 330 configured to generate pseudo random erroneous data in addition to generating error correction code, the similarity of the circuitry of the ECC encoder 330 and the error injection module 300 is such that the error injection module 300 can be configured to generate error correction code in addition to the pseudo random erroneous data. In some embodiments, a single module is configured to provide the functions of both the ECC encoder 330 and the error injection module 300.

As further illustrated in FIG. 3C, the ECC encoder 370 differs from the ECC encoder 330 of FIG. 3B in that it further includes a NOR gate 383, NAND gates 384-386, and an additional flip flop 381. The ECC encoder 370 has an additional input signal MSeq 380. The MSeq signal 380 and an additional output signal pseudo random erroneous data 382 (output of the additional flip flop 381) are provided as inputs to the NAND gate 386. The parity bit-output 355 and the inverted Parity signal 354 are provided as inputs to the NAND gate 384. The NAND gates 384, 386 are in communication with the NAND gate 385, which further communicates with the XOR gate 347. The read-data signal 352 and the Syndrome signal 353 and provided as inputs to the AND gate 350. The output signal of the XOR gate 347 is first inverted and then passed through the NOR gate 383 along with the MSeq signal 380 and then provided as an input to the XOR gate 349. The output signal of the XOR gate 347 is directly provided as an input to the FF 331.

The illustrated ECC encoder 370, in addition to the Syndrome and Parity operating modes of the ECC encoder 330, includes an MSeq mode. The Syndrome and Parity operating modes of the ECC encoder 370 operate as mentioned earlier with reference to the ECC encoder 330 of FIG. 3B. When the Syndrome input signal 353 is high, the Parity input signal 354 and the MSeq input signal 380 are low and the ECC encoder 370 performs an error correction code calculation based on the read-data 352. When the Parity input signal 354 is high, the Syndrome input signal 353 and the Mseq input signal 380 are low and the ECC encoder 370 outputs the calculated error correction code as the parity-bit output 355. Additionally, when the MSeq input signal 380 is high, the Parity input signal 354 and the Syndrome input signal 353 are low, and the ECC encoder 360 generates pseudo random erroneous data and introduces the erroneous data via the pseudo random output signal 382, for example, to the memory array 122 of FIG. 1. The ECC encoder 370, therefore, calculates and outputs error correction code and generates and outputs pseudo random erroneous data.

A solid-state memory device that includes the modified ECC encoder 370 that additionally performs error injection functions by only adding a handful of logic gates uses less circuitry than a solid-state device that includes separate ECC encoder and error injection modules, thereby enabling manufacturers to reduce the size of the solid-state memory device. Size reductions are advantageous because they decrease the cost of manufacturing the solid-state memory devices and, furthermore, are desirable for portable computer systems that increasingly require compact memory devices.

Figure 4:
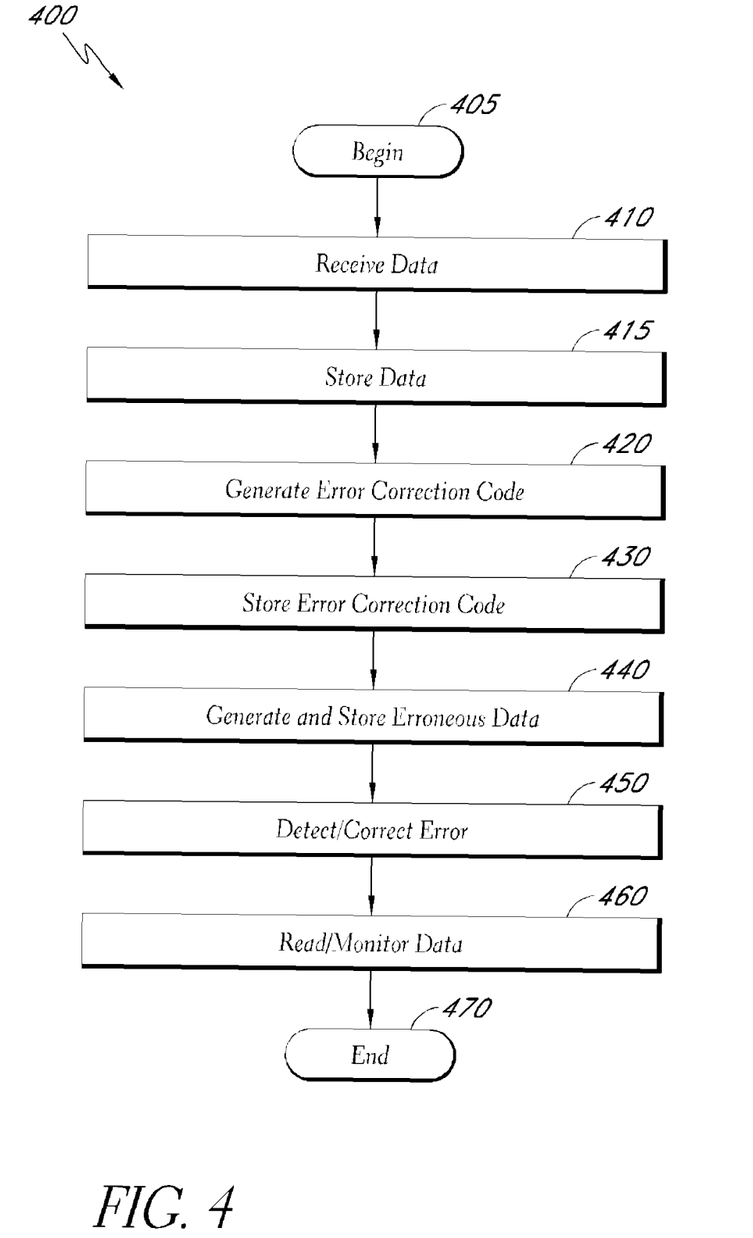
FIG. 4 is a flowchart diagram of one method of testing the operation of an ECC encoder/decoder.

FIG. 4 illustrates one embodiment of a method of testing the operation of ECC encoder/decoders using error injection. In step 405, a solid-state memory device is configured to receive data, store the received data and subsequently provide the stored data. As shown in step 410, the solid-state memory device receives data to write, for example, from a central processing unit such as the CPU 110 of FIG. 1. A memory array area of the solid-state memory device can be configured such that each memory array has a data area arranged in the form of a matrix in a row direction and a column direction, and a syndrome area which stores error correction code corresponding to the data area. In step 415, the solid-state memory device writes the data to a memory storage area, for example, the data area of the memory array.

In step 420 of FIG. 4, the solid-state memory device, for example using an ECC encoder/decoder, generates error correction code, such as, for example, parity bits, Hamming code, or any other error correction code created using a suitable forward error correction algorithm. In some embodiments, the ECC encoder/decoder generates the error correction code when the solid-state memory device enters the low-power consumption mode. The error correction code that the ECC encoder/decoder generates is indicative of the data stored in the memory array, which the ECC encoder/decoder subsequently uses to detect and/or correct errors that occur within the memory array of the solid-state memory device. Although in FIG. 4, the error correction code is generated after the solid-state memory device writes the data into the memory array, the solid-state memory device can simultaneously write the data into the memory array and generate the error correction code using the ECC encoder/decoder. In other embodiments, the solid-state memory device can generate the error correction code before writing the data to memory array. In still other embodiments, the ECC encoder/decoder generates error correction code in a row direction based on the data stored in each row of the memory array, and error correction code in a column direction based on the data stored in each column of the memory array. In another embodiment, the solid-state memory device uses the error injection module to generate error correction code.

As further shown in FIG. 4, the solid-state memory device in step 430 writes the error correction code to the syndrome area of the memory array (different row and/or column address from the data area). The solid-state memory device can also be configured to write the error correction code in an area different from the memory array of the solid-state memory device, for example, in a syndrome storage area located on the error detection and/or correction module 140 of FIG. 1. Various suitable means for the solid-state memory device to write the error correction code is well understood in the art. In some embodiments, the solid-state memory device performs steps 410, 415 and 420 before the solid-state memory device enters the low-power consumption mode. In other embodiments, the solid-state memory device performs steps 410, 415 and 420 after the solid-state memory device enters the low-power consumption mode. In still further embodiments, the solid-state memory device 120 simultaneously writes the error correction code and the data into the memory array. In other embodiments, the solid-state memory device generates and writes the error correction code before writing the data to the memory array.

In step 440 of FIG. 4, the solid-state memory device generates erroneous data using an error injection mechanism, such as the error injection module 300 of FIG. 3A. In this particular example, the error injection module is configured to generate pseudo random erroneous data using the MLS algorithm. In other embodiments, the error injection module can be configured to use other suitable algorithms, such as, for example, fortuna, mersenne twister, or the like, to generate the pseudo random erroneous data. In certain embodiments, the error injection module generates the pseudo random erroneous data at the same time the ECC encoder/decoder generates the error correction code. In still other embodiments, the ECC encoder/decoder is configured to generate the pseudo random erroneous data instead of the error injection module. In some embodiments, a single module is provided to perform the ECC encoder and the error injection module functions. Various other configurations of generating the pseudo random erroneous data is possible and the error injection module, for example, can generate the pseudo random erroneous data during or before each of steps 410, 415, 420 and 430.

Further in step 440, the solid-state memory device, for example using the error injection module or any other suitable module (ECC encoder/decoder), writes the erroneous data, for example pseudo random erroneous data, to the data area of the memory array. The solid-state memory device can write the pseudo random or any other type of erroneous data to the memory array according to various configurations. In one embodiment, the erroneous data is written to all of the data area memory cells of the memory array. In other embodiments, the erroneous data is written to particular memory cells in the memory array (for example memory cells that typically store important data, the integrity of which therefore is highly desired). In still other embodiments, the error injection module or the ECC encoder/decoder write the pseudo random erroneous data to the memory array in a random manner. In another embodiment, the solid-state memory device writes pseudo random erroneous data to the memory array in a sequential manner.

The solid-state memory device can further employ a module, such as an ECC controller, that provides the start and end addresses of the memory array such that the error injection module or the ECC encoder/decoder can store the pseudo random erroneous data to the memory array based on the provided address. In another embodiment, the error injection module stores the erroneous data based on a memory array address provided from external sources, such as, for example, the CPU 110 or a memory controller, via the address bus 115. Other configurations for writing pseudo random erroneous data to the memory array are possible.

Introducing errors into the memory array by purposely injecting the erroneous data into the memory array provides the ECC encoder/decoder with errors (e.g., corrupted data) for the ECC encoder/decoder to detect and/or correct. Writing the pseudo random erroneous data in this manner instead of waiting for the erroneous data to eventually occur during the course of memory device operation should save time during testing of the ECC encoder/decoder, and thus, lowers production costs, as will be discussed further below.

With continued reference to FIG. 4, after erroneous data is written into the memory array, the ECC encoder/decoder in step 450 detects and/or corrects the erroneous data. In one embodiment, the solid-state memory device can use the ECC encoder/decoder to detect and/or correct erroneous data when the solid-state memory device exits a low-power consumption mode. In order to detect and/or correct erroneous data, the ECC encoder/decoder can first retrieve both the erroneous data and the error correction code. In one embodiment, the ECC encoder/decoder receives both the erroneous data and the corresponding error correction code from the memory array (for example erroneous data stored in data area of the memory device and error correction code stored in syndrome area of the memory device). In another embodiment, the ECC encoder/decoder receives the corrupted data from the memory device and retrieves the error correction code from another memory array, for example, a syndrome storage area located on the ECC encoder/decoder, the low-power consumption module, or any other suitable error correction code storage areas. The ECC encoder/decoder uses the error correction code to check the data received from the memory array for errors and/or correct errors indicated by the error correction code.

In step 460, the corrected read data is analyzed to assess the operation of the ECC encoder/decoder (for example, determine whether the ECC encoder/decoder detected and/or corrected the erroneous data). In one embodiment, the ECC encoder/decoder directly provide the corrected data to a device external to the memory device (for example, a processor or test equipment) that is capable of comparing the corrected data to the original written data to assess the detection and/or correction capabilities of the ECC encoder/decoder. In some embodiments, the solid-state memory device reads the corrected data from the memory array and transmits the corrected data to an appropriate system, for example, automated test equipment (ATE), to analyze the accuracy and performance of the ECC encoder/decoder.

Steps 405-470 as illustrated in FIG. 4 are only a subset of the ECC encoder/decoder testing process and skilled artisans will recognize that each of the steps 405-460 can be repeated to test various aspects of the ECC encoder/decoder. For example, the error injection module may be configured to write erroneous data to a particular address of the memory array one at a time for the ECC encoder/decoder to detect and/or correct the erroneous data, and steps 405-460 can be repeated to write erroneous data and detect and/or the erroneous data for other particular addresses. In other embodiments, steps 405-460 can be looped to test the performance of the ECC encoder/decoder at various temperatures, for example, by repeating steps 405-460 for each desired temperature.

Enabling the error injection module to generate pseudo random erroneous data and subsequently injecting the erroneous data to the memory array of the solid-state memory device should make testing the ECC encoder/decoder portion of the solid-state device temperature independent. The erroneous data is generated and written into the memory array so that a testing device such as the automated test equipment does not have to wait for the data in the memory array to degrade. Natural degradation typically various with temperature such that relatively long periods (for example up to 20 seconds) had been used to test ECC encoder/decoders at relatively colder temperatures (for example room temperature).

Intentionally writing pseudo random erroneous data into the memory array of the solid-state memory device for the ECC encoder/decoder to detect and/or correct can have other advantages. In one embodiment, the ECC encoder/decoder can be configured to run entire correction code sequences completely, for example, by forcing all error correction processes to run, thereby providing a way to test various aspects of the ECC encoder/decoder (such as determine maximum number of detectible and/or correctible bits, conduct stress tests, assess reliability characteristics, or the like). In another embodiment as will be discussed below with reference to FIG. 5B, the rate at which the pseudo random erroneous data is injected to the memory array area is adjustable.

Figure 5A:
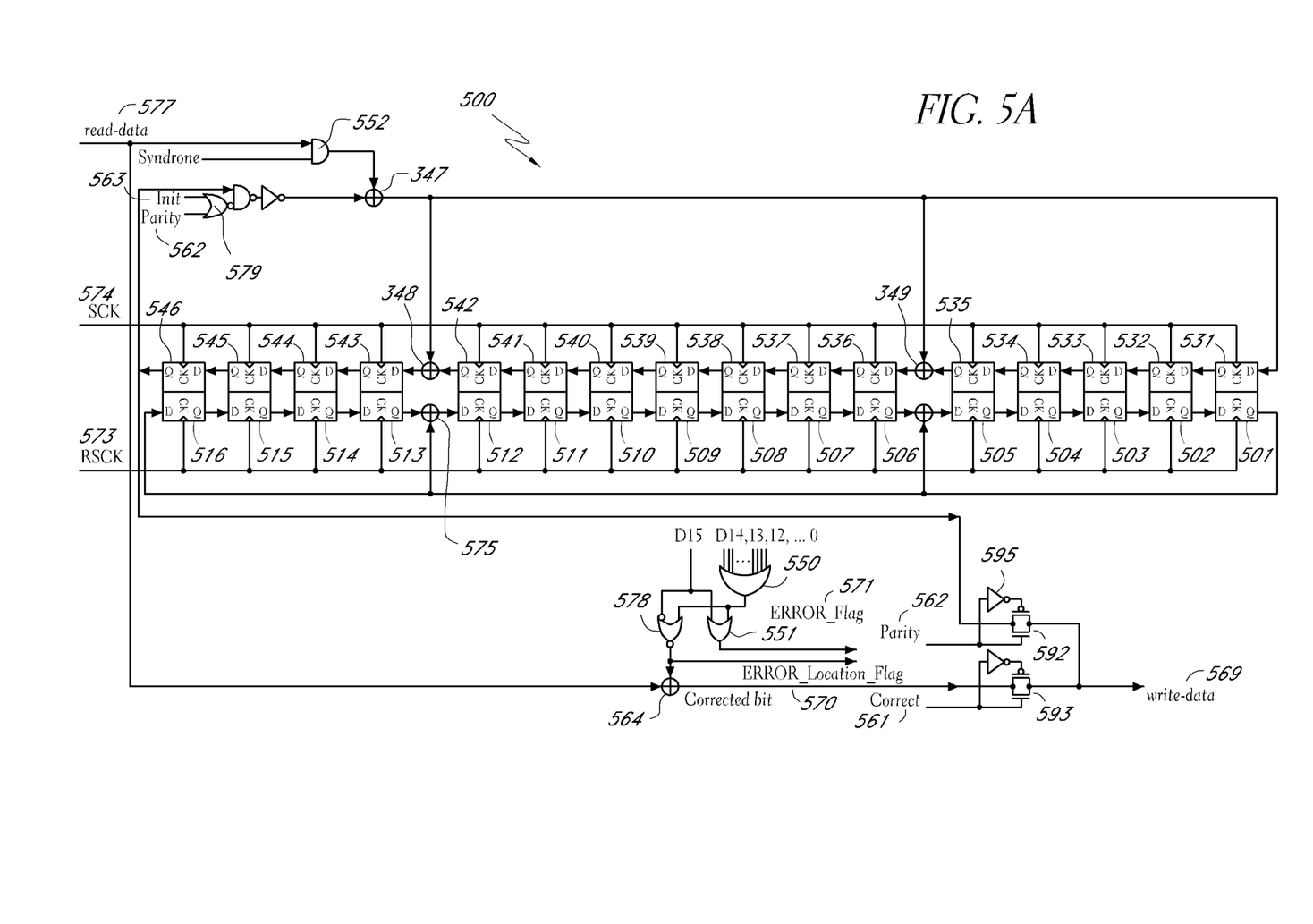
FIG. 5A illustrates an embodiment of a conventional ECC encoder/decoder.

FIG. 5A shows an embodiment of a conventional ECC encoder/decoder 500 that is configured to detect and/or correct erroneous data. As illustrated in FIG. 5A, the ECC encoder/decoder 500 includes D-type flip-flops 501-516, 531-546, switches 592, 593, inverters 595, 596, OR gate 550, 551, an AND gate 552, XOR gates 347-349, XOR gates 557, 564, 575, NOR gates 578, 579 and a NAND gate 559. The ECC encoder/decoder 500 also has input signals read-data 577, Syndrome 560, SCK (shift clock) 574, RSCK (reverse shift clock) 573, Correct 561, Parity 562, and Init 563. Signals D15 . . . D0 are outputs of the FFs 531-545. The ECC encoder/decoder 500 includes output signals ERROR_Flag 571, ERROR_Location Flag 570, and write-data 569.

The read-data signal 577 and the Syndrome signal 560 are provided as inputs to the AND gate 552, which is in communication with the XOR gate 347. The Init signal 563 and the Parity signal 562 are provided as input to the NOR gate 579, which is in communication with the NAND gate 559. The output of the FF 546 and the output of the NOR gate 579 are provided as inputs to the NAND gate 559, the output of which is inversed and provided as an input to the XOR gate 347 along with the output of the AND gate 552.

The output signal of the XOR gate 347 is directly provided as an input to the FF 531. As shown in FIG. 5A, the output signal of the XOR gate 347 is also passed through the XOR gate 348 along with the output signal of the FF 542 and provided as an input to the FF 543. The output of FF 546 (error correction code) is transmitted to the switch 592, which is controlled by Parity signal 562. The output of the switch 592 is provided as the write-data 569.

The SCK clock signal is transmitted to the FFs 531-546 as input signal CK 531-547, for example, by an ECC controller (not shown). SCK clock signal is transmitted to the FFs 531-546 for all modes of operation (Init, Syndrome, etc.) except the Correct mode, which is synchronized by the RSCK clock signal. In some embodiments, the RSCK clock signal is provided by an ECC controller (not shown).

The FFs 501-516 are arranged such that the ECC encoder/decoder 500 operates as a step shift register that has a feedback loop by way of the XOR gates 575, 557. The output signal of the FF 501 is passed through the XOR gate 557 along with the output signal of the FF 506 and provided as an input to the FF 505. The output signal of the FF 501 is also passed through the XOR gate 575 along with the output signal of the FF 513 and provided as an input to the FF 512. The output signal of the FF 501 is provided as an input to the FF 516. Additionally, the RSCK clock signal is transmitted to the FFs 501-516 as input signal CK 501-516.

The signals D14 . . . D0 are coupled through the OR gate 550, the output of which is provided as one of the inputs to the OR gate 551 and the NOR gate 578. The signal D15 is provided as the second input to the OR gate 551 and the NOR gate 578. The output of the OR gate 551 is ERROR_Flag 571. The output of the NOR gate 578, ERROR_Location_Flag 570, is provided as an input to the XOR gate 563 along with the read-data 577. The output of XOR gate 563 is transmitted to the switch 593, which is controlled by the Correct signal 561. The output of the switch 593 is write-data 569.

The enable signals and operation of the ECC encoder/decoder 500 will now be briefly discussed. The mode of operation of the ECC encoder/decoder 500 is determined by setting the corresponding enable signal (Syndrome, Init, Parity, Correct) to high. When the Init signal is high, the flip-flops 501-516 and flip-flops 531-546 are cyclically shifted and reset. When the Syndrome signal is high, the ECC encoder/decoder fetches read data, for example from the read-data signal 577, and performs error correction code calculation. When the Parity signal is high, the ECC encoder/decoder 500 couples the calculated error correction code, for example for storage to a syndrome area of a memory array area, through the write-data signal 569. When the Correct signal is high, the ECC encoder/decoder 500 detects and/or corrects errors, and outputs the corrected data as write data 569 via the switch 593. During the correct mode operation of the ECC encoder/decoder 500, the SCK input signal 574 is set to low and the RSCK input signal 573 is set to high. In such an embodiment, only one of the enable signals will be high at a time.

Figure 5B:
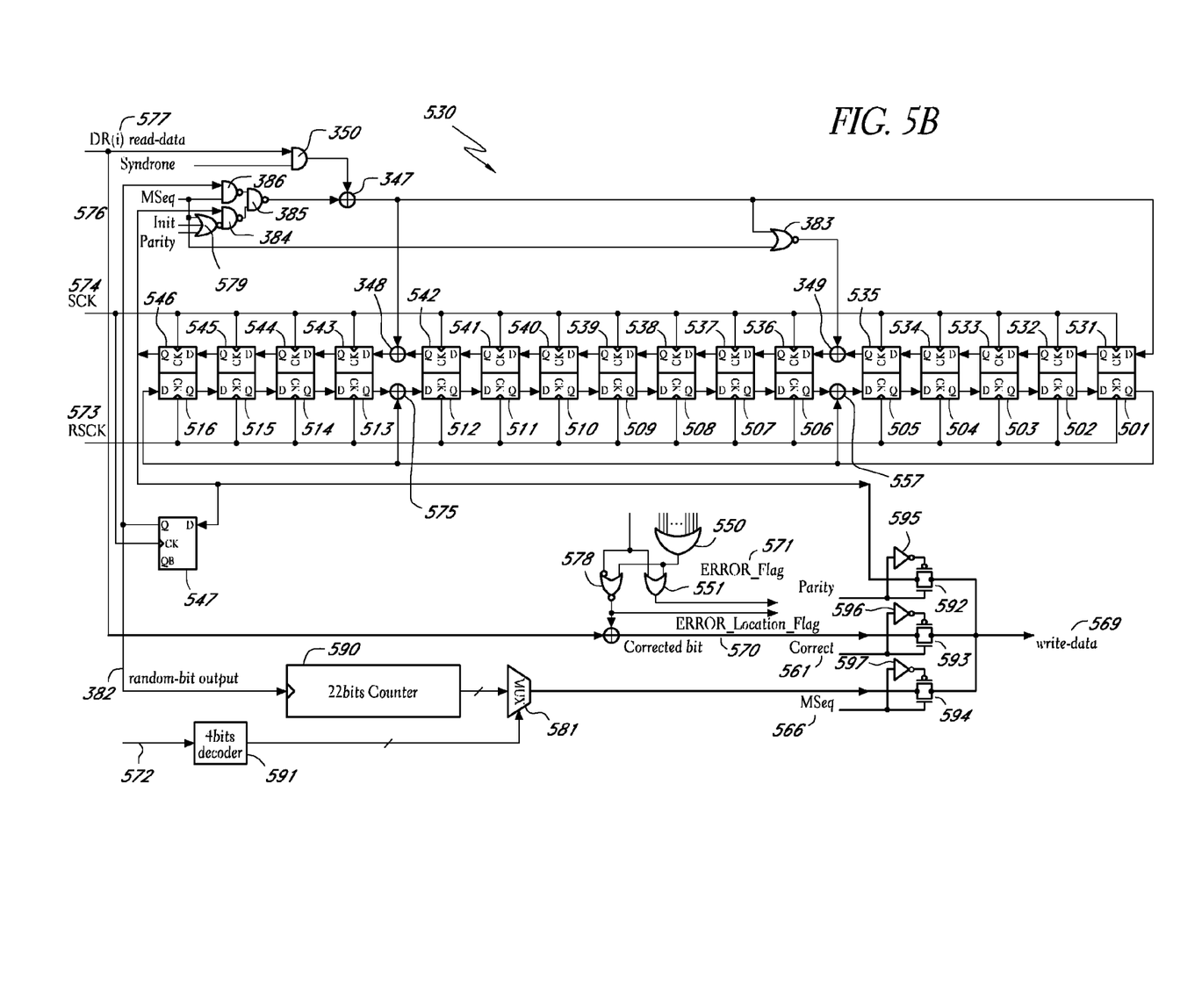
FIG. 5B is an embodiment of an ECC encoder/decoder that is configured to generate pseudo random erroneous data.

FIG. 5B shows an embodiment in which the ECC encoder/decoder 530 is configured to detect and/or correct errors as well as generate pseudo random erroneous data. As will be discussed below, the ECC encoder/decoder 530 additionally provides a mechanism for adjusting the error rate at which the ECC encoder/decoder 530 injects errors, for example, to the memory array area 122 of the solid-state memory device 120.

As illustrated in FIGS. 5A and 5B, the basic structure of the conventional ECC encoder/decoder 500 can be modified to generate pseudo random erroneous data using the MLS algorithm because the circuitry used to generate hamming code and MLS pseudo random erroneous data are similar. While FIG. 5B shows the ECC encoder/decoder 530 configured to generate error correction code using the hamming code algorithm or pseudo random erroneous data using the MLS algorithm, the ECC encoder/decoder 500 can be configured to generate error correction code or pseudo random erroneous data according to other pairs of algorithms. The additional components and features of the ECC encoder/decoder 530 with reference to FIG. 5B will be further discussed below.

As FIG. 5B illustrates, the ECC encoder/decoder 530 includes an FF 547, a counter 590, a multiplexer (mux) 581, a switch 594, an inverter 597, NAND gates 384-386, NOR gates 565, 579 and a decoder 591. The ECC encoder/decoder 530 also has additional input signals TM_ERRSelect 572 and MSeq 566.

The MSeq input signal 566 and the output of the FF 547 (pseudo random erroneous data 382) are provided as input to the NAND gate 386, which is in communication with the NAND gate 385. The MSeq input signal 566, the Init input signal 563 and the Parity input signal 562 are provided as inputs to the NOR gate 579, the output of which is provided as a second input to the NAND gate 384.

The output signals of the NAND gates 384, 386 are provided as input to the NAND gate 385, which is in communication with the XOR gate 347. The signal from the XOR gate 347 is passed through the NOR gate 383 along with the MSeq signal 566 and then provided as an input to the XOR gate 349. The output signal of the XOR gate 347 is directly provided as an input to the FF 531. Additionally, the SCK clock signal is transmitted to the FFs 531-547 as input signal CK 531-547, for example, by an ECC controller (not shown). SCK clock signal is transmitted to the FFs 531-547 for all modes of operation (Init, Syndrome, Parity, MSeq, etc.) except the Correct mode, which is synchronized by the RSCK clock signal. In some embodiments, the RSCK clock signal is provided by an ECC controller (not shown).

As further illustrated in FIG. 5B, the pseudo random erroneous data 382 is further provided as an input to the counter 590. The counter 590 is in communication with the mux 581 and provides input data to the mux 581 for multiplexing. The input signal TM_ERRSelect 572 is provided as an input to the decoder 591, which is in communication with the mux 581. The output of the decoder 591 is used to select, using the mux 581, the output of the counter 590 so as to adjust the number of error bits that the ECC encoder/decoder 530 introduces to a memory array area of a memory device. Said another way, it is possible to control, using the TM_ERRSelect 572 signal, the portion of the data in the memory array that is to be corrupted. The input signal TM_ERRSelect 572 can be used to determine the error rate used during test of the solid-state memory device by selecting the pseudo random erroneous data bits that are outputted by the ECC encoder/decoder 530 using the write-data signal 569 via the mux 581.

The enable signal and operation of the MSeq 566 of the ECC encoder/decoder 530 will now be briefly discussed. The operation of the ECC encoder/decoder in Init, Syndrome, Parity and Correction modes is discussed with reference to the ECC encoder/decoder 500 of FIG. 5A. As depicted in FIG. 5B, when the MSeq signal 566 is high, the ECC encoder/decoder 530 generates and outputs pseudo random erroneous data according to the MLS algorithm using the write-data signal 569.

Although the foregoing invention has been described in terms of certain embodiments, other embodiments will be apparent to those of ordinary skill in the art from the disclosure herein. For example, a skilled artisan will recognize that various methods of manufacture, design, and materials can be used with the present disclosure. Additionally, other combinations, omissions, substitutions and modifications will be apparent to the skilled artisan in view of the disclosure herein. It is contemplated that various aspects and features of the invention described can be practiced separately, combined together, or substituted for one another, and that a variety of combination and sub combinations of the features and aspects can be made and still fall within the scope of the invention. Furthermore, the systems described above need not include all of the modules and functions described in the disclosed embodiments. Accordingly, the invention is not intended to be limited by the recitation of the disclosed embodiments, but is to be defined by reference to the appended claims.

We claim:

1. A method of self testing an error correction code (ECC) encoder and/or decoder (encoder/decoder) of a solid-state memory device, the method comprising:
   writing data to a memory array;
   generating an error correction code based on the data using a shift register of the ECC encoder/decoder;
   generating pseudo random erroneous data using the shift register of the ECC encoder/decoder;
   writing the erroneous data to the memory array;
   retrieving the erroneous data from the memory array; and
   using the error correction code and the retrieved erroneous data to test the ECC encoder/decoder.

2. The method of claim 1, wherein using the error correction code comprises correcting the erroneous data using the error correction code and analyzing the corrected data to assess the operation of the ECC encoder/decoder.

3. The method of claim 1, wherein generating error correction code comprises generating the error correction code in accordance with a Hamming code algorithm.

4. The method of claim 1, wherein generating pseudo random data comprises generating pseudo random data in accordance with the maximum-length sequence algorithm.

5. The method of claim 1, wherein generating the error correction code based on the data using the shift register of the ECC encoder/decoder comprises generating the error correction code based on the data using a linear feedback shift register of the ECC encoder/decoder.

6. The method of claim 1, further comprising adjusting an error injection rate.

7. The method of claim 5, wherein generating pseudo random erroneous data using the shift register of the ECC encoder/decoder comprises generating the pseudo random erroneous data using the linear feedback shift register of the ECC encoder/decoder.

8. The method of claim 1, wherein writing the erroneous data to the memory array comprises writing errors to the memory array using externally provided start and end memory array addresses.

9. The method of claim 1, wherein writing the erroneous data to the memory array comprises purposely writing errors to the memory array in a sequential manner.

10. The method of claim 1, further comprising storing the error correction code to a syndrome storage area of the ECC encoder/decoder.

11. An apparatus comprising:
a memory array to store data; and
an error detection and/or correction module comprising a shift register, the error detection and/or correction module configured to:
generate an error correction code using the shift register;
generate erroneous data using the shift register;
write the erroneous data to the memory array;
retrieve the erroneous data stored in the memory array; and
detect and/or correct errors in data stored in the memory array.

12. The apparatus of claim 11, wherein the memory array comprises a dynamic random access memory (DRAM) memory array.

13. The apparatus of claim 11, wherein the memory array comprises a non-volatile memory array.

14. The apparatus of claim 11, wherein the error detection and/or correction module is configured to generate the error correction code according to a Hamming code algorithm.

15. The apparatus of claim 11, wherein the error detection and/or correction module being configured to generate erroneous data comprises the error detection and/or correction module being configured to generate pseudo random erroneous data.

16. The apparatus of claim 15, wherein the error detection and/or correction module is configured to generate the pseudo random erroneous data according to a maximum-length sequence algorithm.

17. The apparatus of claim 15, wherein the shift register comprises a linear shift register.

18. The apparatus of claim 15, wherein the error detection and/or correction module is configured to generate the pseudo random erroneous data according to a fortuna algorithm.

19. The apparatus of claim 15, wherein the error detection and/or correction module is configured to generate the pseudo random erroneous data according to a mersenne twister algorithm.

20. The apparatus of claim 15, wherein the error detection and/or correction module is configured to adjust an error injection rate.

21. The apparatus of claim 11, wherein the error detection and/or correction module is configured to actively generate the erroneous data and write the erroneous data to the memory array such that of the error detection and/or correction module is temperature independent.

22. A solid-state memory device comprising:
an error injection module configured to generate pseudo random erroneous data, wherein the pseudo random erroneous data is written in a memory array of the solid-state memory device; and
an error correction code (ECC) encoder and/or decoder (encoded/decoder) configured to detect and/or correct errors in data stored in the memory array in accordance with an ECC; and
wherein the error injection module and the ECC encoder/decoder share a shift register.

* * * * *

UNITED STATES PATENT AND TRADEMARK OFFICE
CERTIFICATE OF CORRECTION

PATENT NO. : 8,627,163 B2
APPLICATION NO. : 12/055207
DATED : January 7, 2014
INVENTOR(S) : Yutaka Ito et al.

It is certified that error appears in the above-identified patent and that said Letters Patent is hereby corrected as shown below:

In the Claims

In column 12, line 54, in Claim 4, before "data" insert -- erroneous --.

In column 14, line 21, in Claim 21, after "that" insert -- testing --.

In column 14, line 29, in Claim 22, delete "(encoded/decoder)" and insert -- (encoder/decoder) --, therefor.

Signed and Sealed this
First Day of April, 2014

Michelle K. Lee
*Deputy Director of the United States Patent and Trademark Office*